United States Patent
Branson et al.

(10) Patent No.: US 9,342,385 B2
(45) Date of Patent: *May 17, 2016

(54) RECONFIGURING AN OPERATOR GRAPH BASED ON ATTRIBUTE USAGE

(71) Applicant: International Business Machines Corporation, Armonk, NY (US)

(72) Inventors: Michael J. Branson, Rochester, MN (US); Bradford L. Cobb, Katy, TX (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/742,774

(22) Filed: Jun. 18, 2015

(65) Prior Publication Data

US 2015/0286512 A1  Oct. 8, 2015

Related U.S. Application Data

(63) Continuation of application No. 13/864,784, filed on Apr. 17, 2013, now Pat. No. 9,147,010.

(51) Int. Cl.
*G06F 17/30* (2006.01)
*G06F 7/00* (2006.01)
(Continued)

(52) U.S. Cl.
CPC .............. *G06F 9/544* (2013.01); *G06F 9/4405* (2013.01); *G06F 9/4436* (2013.01); *G06F 9/5083* (2013.01); *G06F 15/177* (2013.01); *G06F 17/30958* (2013.01)

(58) Field of Classification Search
CPC ................ G06F 17/30516; G06F 8/433
USPC ................................................ 707/798
See application file for complete search history.

(56) References Cited

U.S. PATENT DOCUMENTS 6,944,162 B1 * 9/2005 Hill .................... H04L 45/04 370/392
7,369,557 B1 * 5/2008 Sinha ................. H04L 45/38 370/392

(Continued)

OTHER PUBLICATIONS

Ballard et al., "IBM InfoSphere Streams: Harnessing Data in Motion", Sep. 2010, 360 pages, IBM Redbooks http://www.redbooks.ibm.com/abstracts/sg247865.html.

(Continued)

*Primary Examiner* — Pavan Mamillapalli
(74) *Attorney, Agent, or Firm* — Richard A. Wilhelm; Feb R. Cabrasawan (57) ABSTRACT

A first processing element may be initially configured to transmit a first output stream to a second processing element. The second processing element may be initially configured to transmit a second output stream to a third processing element. The tuples of the first and second output streams may have the first and second attributes. It may be determined whether the first attribute is to be first processed at the second processing element (first condition) and whether the second attribute is to be first processed at the third processing element (second condition). When the first and second conditions are met, the first processing element may be reconfigured to transmit a third output stream to the second processing element and a fourth output stream to the third processing element. The third output stream may have only the first attribute. The fourth output stream may have only the second attribute.

6 Claims, 7 Drawing Sheets

(51) Int. Cl.
*G06F 9/54* (2006.01)
*G06F 9/44* (2006.01)
*G06F 9/50* (2006.01)
*G06F 15/177* (2006.01)

(56) References Cited

U.S. PATENT DOCUMENTS

| | | | |
|---|---|---|---|
| 7,436,830 B2 * | 10/2008 | Ben-Nun | H04L 45/7453 |
| | | | 370/235 |
| 7,529,752 B2 | 5/2009 | Hinshaw et al. | |
| 7,613,848 B2 | 11/2009 | Amini et al. | |
| 7,644,110 B2 | 1/2010 | Nishizawa et al. | |
| 7,834,875 B2 | 11/2010 | Liu et al. | |
| 7,940,672 B2 | 5/2011 | Chen et al. | |
| 7,941,524 B2 | 5/2011 | Chkodrov et al. | |
| 8,095,690 B2 | 1/2012 | Kashiyama et al. | |
| 8,326,822 B2 | 12/2012 | Mishra et al. | |
| 8,346,511 B2 | 1/2013 | Schoning et al. | |
| 8,560,526 B2 | 10/2013 | Santosuosso et al. | |
| 8,560,527 B2 | 10/2013 | Santosuosso et al. | |
| 8,630,997 B1 | 1/2014 | Kulkin et al. | |
| 8,732,300 B2 * | 5/2014 | Barsness | G06F 17/30516 |
| | | | 709/223 |
| 2006/0064438 A1 | 3/2006 | Aggarwal | |
| 2006/0265365 A1 | 11/2006 | Chkodrov et al. | |
| 2007/0121674 A1 | 5/2007 | Chen et al. | |
| 2007/0299980 A1 | 12/2007 | Amini et al. | |
| 2008/0005392 A1 | 1/2008 | Amini et al. | |
| 2008/0028414 A1 | 1/2008 | Couture-Gagnon et al. | |
| 2008/0072221 A1 | 3/2008 | Chkodrov et al. | |
| 2008/0301135 A1 | 12/2008 | Alves et al. | |
| 2009/0006320 A1 | 1/2009 | Ding et al. | |
| 2009/0125550 A1 | 5/2009 | Barga et al. | |
| 2009/0313614 A1 | 12/2009 | Andrade et al. | |
| 2010/0106946 A1 | 4/2010 | Imaki et al. | |
| 2010/0229178 A1 | 9/2010 | Ito | |
| 2010/0293535 A1 | 11/2010 | Andrade et al. | |
| 2011/0016123 A1 | 1/2011 | Pandey et al. | |
| 2011/0178775 A1 | 7/2011 | Schoning et al. | |
| 2012/0039336 A1 * | 2/2012 | Richmond | G06F 9/545 |
| | | | 370/392 |
| 2012/0047505 A1 | 2/2012 | Branson et al. | |
| 2012/0066184 A1 | 3/2012 | Barsness et al. | |
| 2012/0179809 A1 | 7/2012 | Barsness et al. | |
| 2012/0215934 A1 | 8/2012 | Barsness et al. | |
| 2012/0218268 A1 | 8/2012 | Accola et al. | |

OTHER PUBLICATIONS

Cipriani et al. "M-TOP: Multi-Target Operator Placement of Query Graphs for Data Streams", IDEAS '11: Proceedings of the 15th Symposium on International Database Engineering and Applications, Sep. 2011, pp. 52-60, ACM, New York, NY, DOI: 10.31145/2076623.2076631.

Branson et al., "Reconfiguring an Operator Graph Based on Attribute Usage", U.S. Appl. No. 13/864,784, filed Apr. 17, 2013.

* cited by examiner

RECONFIGURING AN OPERATOR GRAPH BASED ON ATTRIBUTE USAGE

This application is a continuation of U.S. patent application Ser. No. 13/864,784 filed Apr. 17, 2013.

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing tuples. The method, system, and computer program receive two or more tuples to be processed by two or more processing elements operating on one or more computer processors. The processing elements include first, second, and third processing elements. The first processing element may be initially configured to transmit a first output stream to the second processing element. The tuples of the first output stream may have first and second attributes. The second processing element may be initially configured to transmit a second output stream to a third processing element. The tuples of the second output stream may also have the first and second attributes. The method may include determining whether first and second conditions are met, where the first condition is that the first attribute is to be first processed at the second processing element and the second condition is that the second attribute is to be first processed at the third processing element. In addition, the method may include reconfiguring the first processing element when the first and second conditions are met. The first processing element may be reconfigured to transmit a third output stream to the second processing element and a fourth output stream to the third processing element. The tuples of the third output stream may have only the first attribute, while the tuples of the fourth output stream may have only the second attribute.

BRIEF DESCRIPTION OF THE DRAWINGS

Like reference numbers and designations in the various drawings indicate like elements.

DETAILED DESCRIPTION

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. In various embodiments, a particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. When a stream operator receives a tuple, it may perform operations, such as analysis logic, which can change the tuple by adding or subtracting attributes, or updating the values of existing attributes within the tuple. When the analysis logic is done, a new tuple is then sent to the next stream operator. An input tuple corresponding with a particular entity that is received by a stream operator or processing element, however, is generally not considered to be the same tuple that is output by the stream operator or processing element, even when the output tuple corresponds with the same entity or data as the input tuple. It is not required, however, that an output tuple be changed in some way from the input tuple.

Nonetheless, an output tuple may be changed in some way by a stream operator or processing element. An attribute or metadata may be added, deleted, or changed. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. Because an output tuple may be considered a different tuple from a corresponding input tuple, a parent-child scheme may be useful for tracking tuple flow in an operator graph. In an exemplary scheme, any tuple may be designated a parent tuple. For example, a tuple entering an operator graph or a tuple output by a source operator may be designated as a parent tuple. Generally, when a parent tuple is received by a stream operator or processing element, the output corresponding with the input tuple may be designated a child of the parent. The child tuple may in turn be input to another stream operator or processing element. The output from the second stream operator or processing element corresponding with the input child tuple may also be designated a child of the parent, as further described below. In addition, as mentioned, any tuple may be designated a parent tuple. Accordingly, a tuple that is a child of a parent tuple may itself be designated a parent tuple.

While a parent-child scheme may be useful for tracking tuple flow in an operator graph in some contexts, in other contexts it may be simpler to refer to both an input tuple and a corresponding output tuple as the same tuple.

In stream computing applications, the stream operators and processing elements of an operator graph may be distributed across multiple compute nodes as well as within individual compute nodes. Processing elements and stream operators in distinct processing elements may be connected by inter-process operator communication paths. An "inter-process communication path," as used herein, may refer to operations that use a network and employ an internet socket, such as a TCP/IP socket, a stream socket, a datagram socket, or any other similar operation. An inter-process communication path, as used herein, may also refer to operations that employ a shared memory segment, a pipe, a named pipe (also known as a FIFO), a message queue, a memory mapped file, a UNIX domain or inter-process communication socket, or any other similar operation.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

Figure 1:
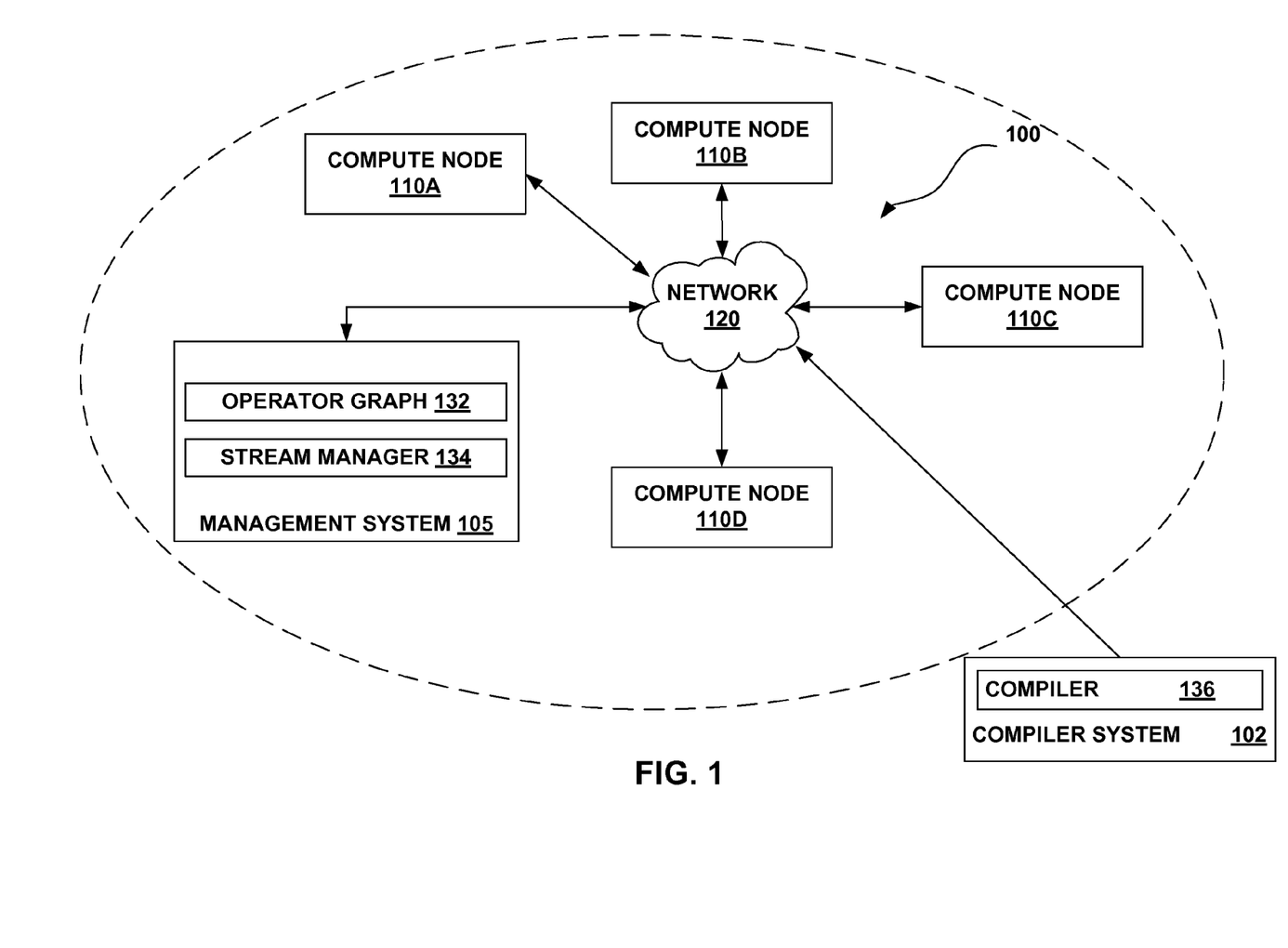
FIG. 1 illustrates a computing infrastructure configured to execute a stream computing application according to various embodiments.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on numerous factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
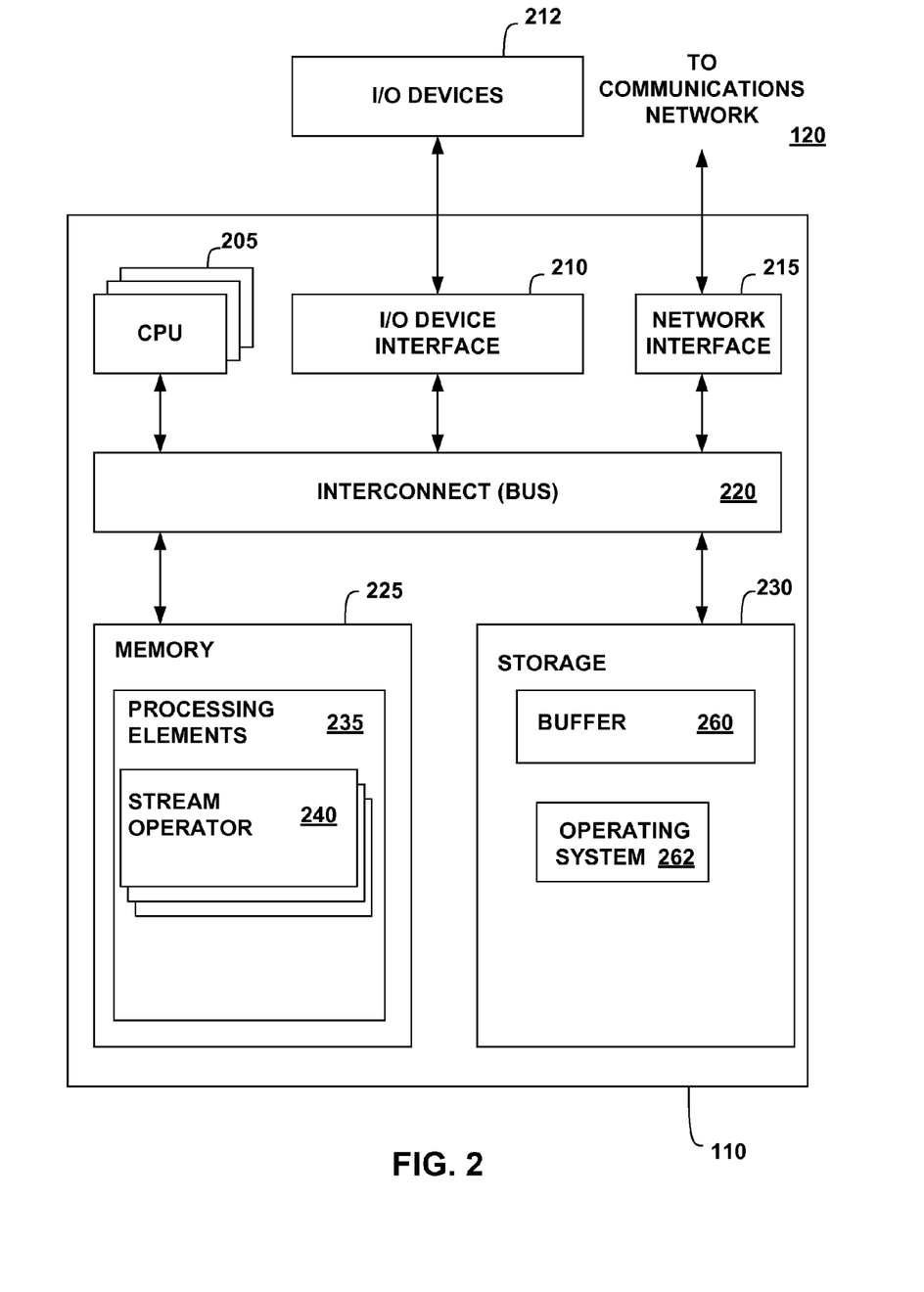
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
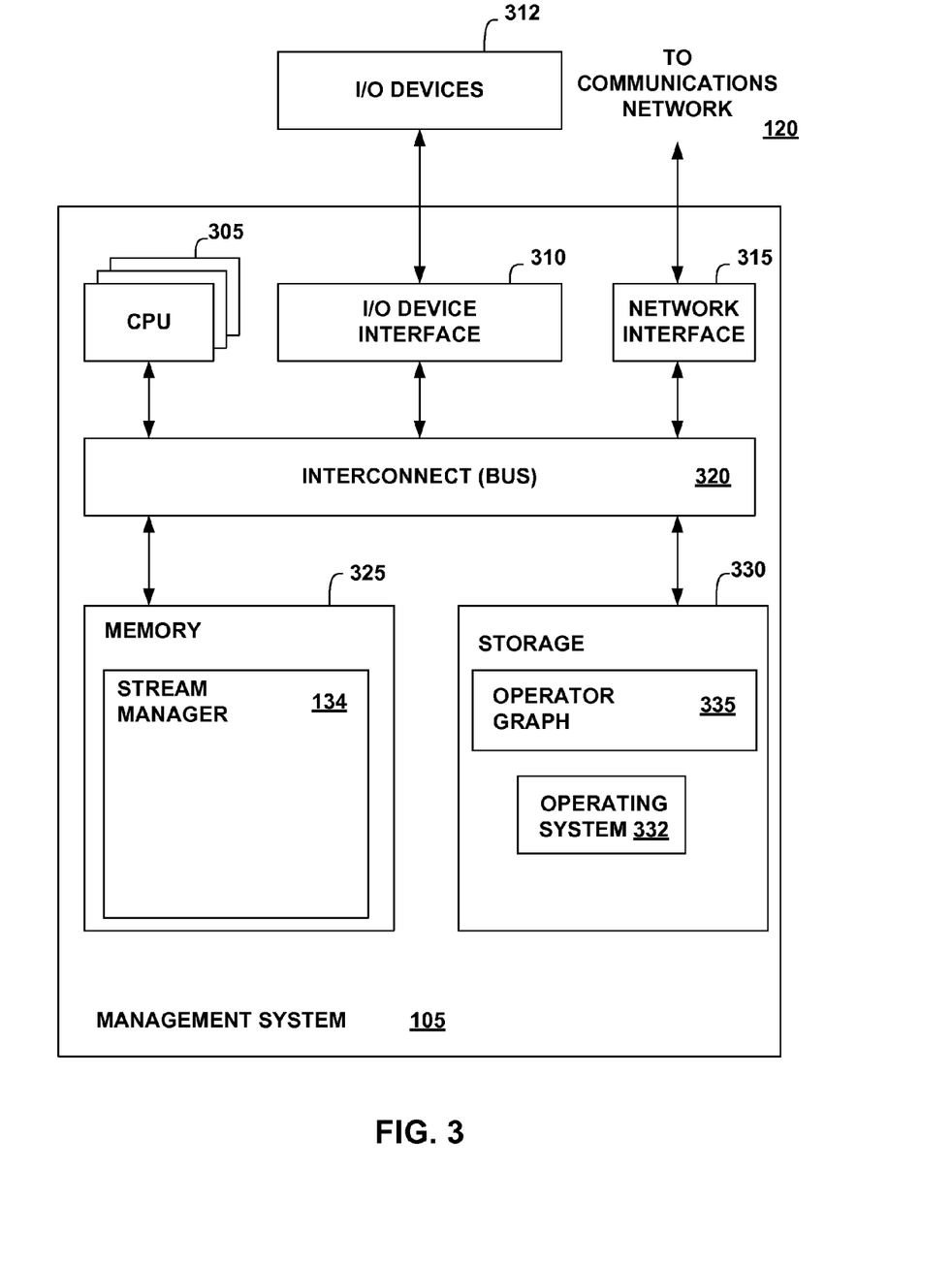
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
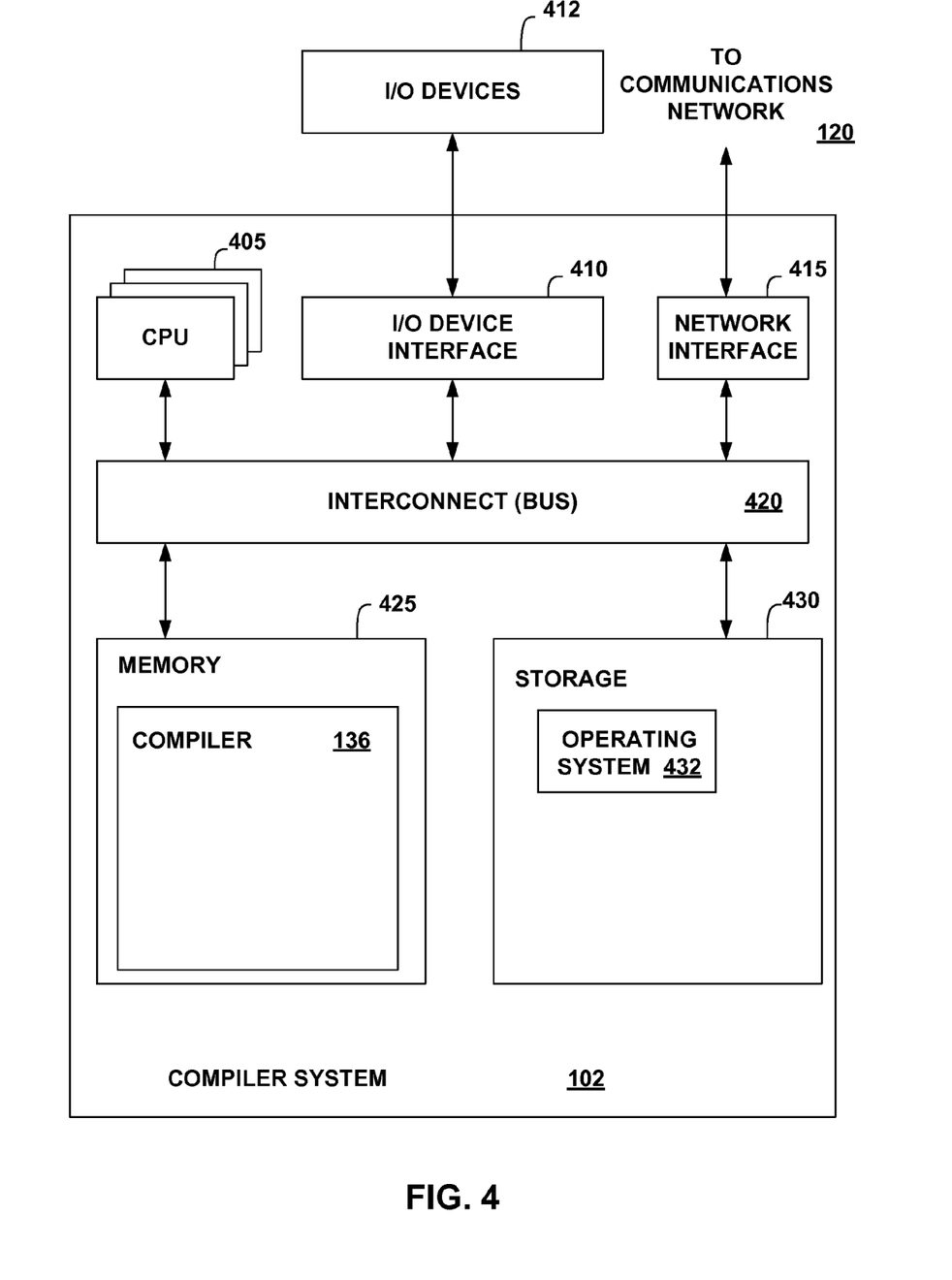
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
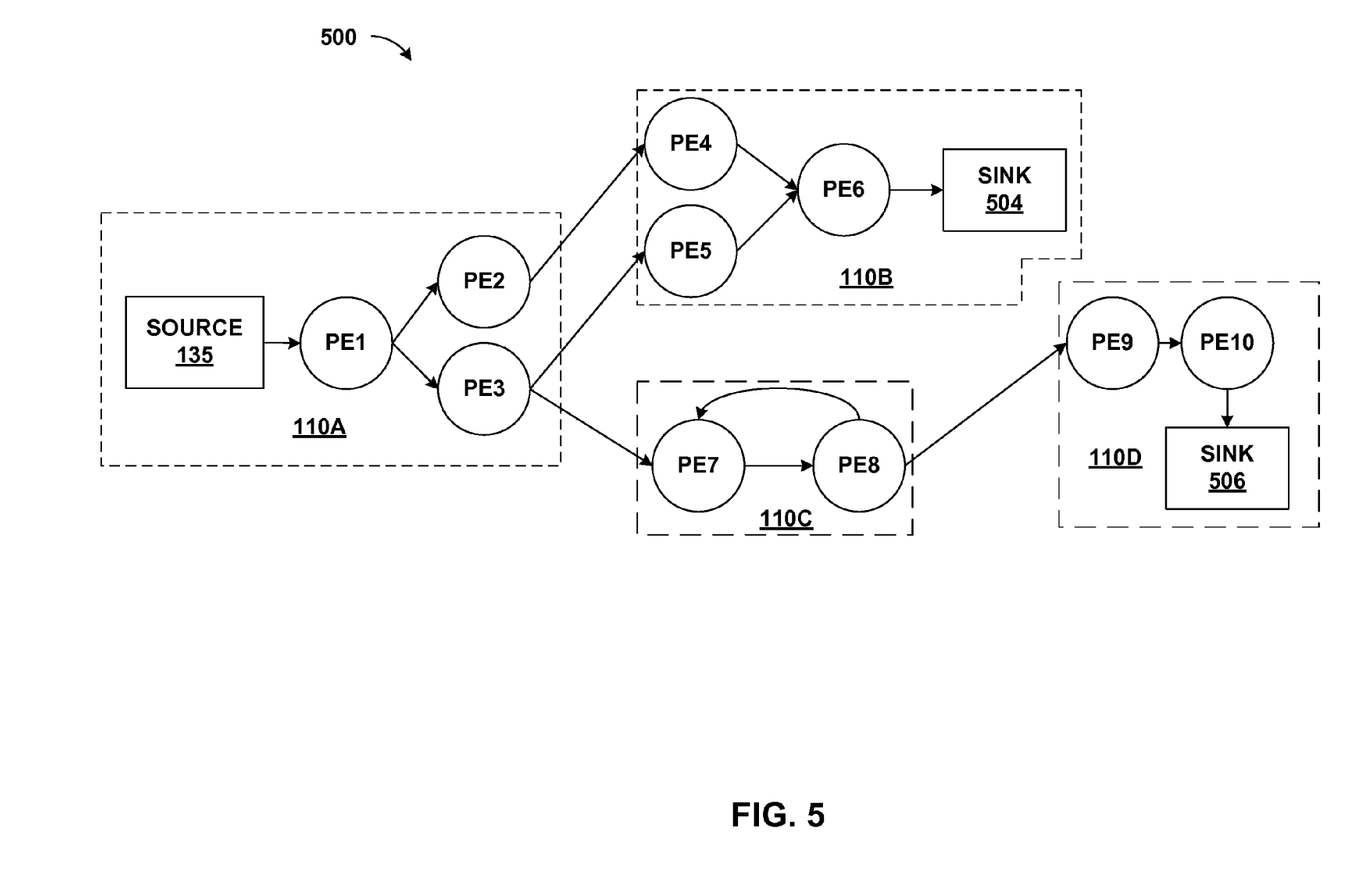
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, it should be appreciated that an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
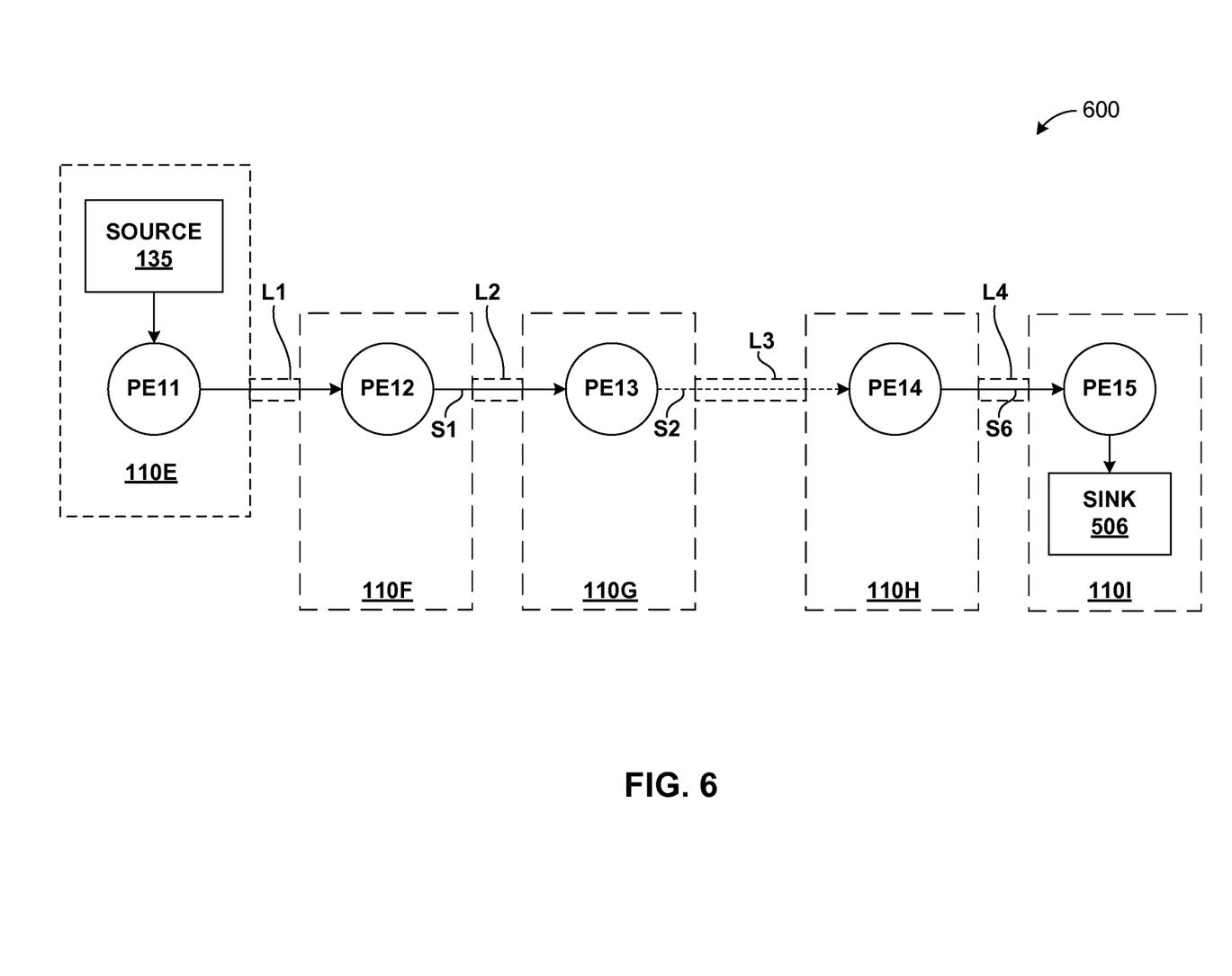
FIG. 6 illustrates an operator graph for a stream computing application according to various embodiments.

FIG. 6 illustrates an exemplary operator graph 600 for a stream computing application beginning from source 135 through to sink 506 according to various embodiments. The exemplary operator graph 600 shown in FIG. 6 includes five processing elements (labeled as PE11-PE15) running on the compute nodes 110E-110I. Each compute node may communicate with other nodes and tuples may be transmitted via inter-process communication paths (labeled as L1-L4). In one embodiment, the operator graph 600 may include one or more additional compute nodes between nodes 110G and 110H. Each additional compute node may have one or more processing elements on an execution path between PE13 and PE14.

The configuration of the operator graph 600 may be initially determined by an application developer, the compiler 136 (FIG. 4), or a combination of the application developer and the compiler 136. Similarly, the configuration of the processing elements PE11-PE15, i.e., the operations each processing element performs, may be initially determined by an application developer, the compiler 136, or a combination of the application developer and the compiler 136.

The operator graph 600 may receive a stream of input tuples, e.g., two or more tuples. The processing element PE12 may initially be configured to output a first output stream S1 to the processing element PE13. The tuples of the first output stream S1 may have multiple attributes, e.g., at least first and second attributes. In addition, the processing element PE13 may be initially configured to output a second output stream S2 to the processing element PE14. The tuples of the second output stream S2 may have the same multiple attributes as the first output stream S1, e.g., at least the first and second attributes.

Consider an example of output streams and operator processing configurations for the operator graph 600. A stream computing application may be an image analysis application. The image analysis may include an edge detection process that may modify an original image in several steps, such as filtering, thresholding, and forming an image comprised of edge lines rendered on a monochromatic background. The edge detection process may generate several modified versions of the original image at various stages in the process. The first output stream S1 may include tuples having a first attribute of a first image and a second attribute of a second image. The first image may be an intermediate image in an edge detection process. The second image may be the original image that is being analyzed. The second output stream S2 may also include tuples having the first attribute for the intermediate image and the second attribute for the original image. The processing element PE13 processes the first attribute (the intermediate image), but does not process or modify the second attribute (the original image). The processing element PE13 passes the second attribute to PE14 without processing or modifying it. Thus, the second output stream S2 includes an unmodified copy of the second attribute (the original image) of the first output stream S1. The processing element PE14 processes the second attribute, but may or may not process or modify the first attribute. For example, PE14 may perform another image analysis operation on the original image. However, the processing element PE14 is typically configured to receive a tuple that includes both the first and second attributes.

In the operator graph 600, the processing element PE12 may initially be configured to transmit the first output stream S1 to processing element PE13. Further, the processing element PE13 may initially be configured to transmit the second output stream S2 to PE14. Alternatively, the execution path between PE13 and PE14 may include one or more compute nodes (or processing elements) and the processing element PE14 may be initially configured to receive the second output stream via one or more intervening processing elements. If each of the compute nodes (or processing elements) on the execution path between PE13 and PE14 passes the second attribute on to a next compute node (or processing element) without processing or changing it, PE14 may receive an input stream that is equivalent (for purposes of explaining one aspect of the principles of this disclosure) to the second output stream S2 directly transmitted from PE13 to PE14. Accordingly, in one alternative, the processing element PE13 (and any additional processing elements along the execution path between PE13 and PE14) may initially be configured to transmit a "second output stream" to PE14 via one or more intervening processing elements. Consequently, regardless of whether PE14 receives the second output stream S2 directly or indirectly from PE13, it may contain an unmodified copy of the second attribute of the first output stream.

According to various embodiments, the locations where each attribute of a tuple are processed may be determined, i.e., the processing elements that process particular attributes of a tuple may be indentified. While a processing element may process every attribute of each tuple it receives, in many applications it is common for a particular processing element to be configured to process fewer than all of the attributes of the tuples it receives. A processing element may only process one or two attributes and pass other attributes of a multi-attribute tuple on to the next processing element without processing them. In the example of FIG. 6, it may be determined that the first attribute but not the second attribute is processed at processing element PE13. In addition, it may be determined that the second attribute is processed at processing element PE14 but not by PE13, or by any of multiple processing elements on an execution path between PE12 and PE14. In other words, the first attribute (a modified version of the original image) is first processed at element PE13. The second attribute (the original image) is passed on by PE13, without processing, to PE14, i.e., the second attribute is first processed by PE14.

Figure 7:
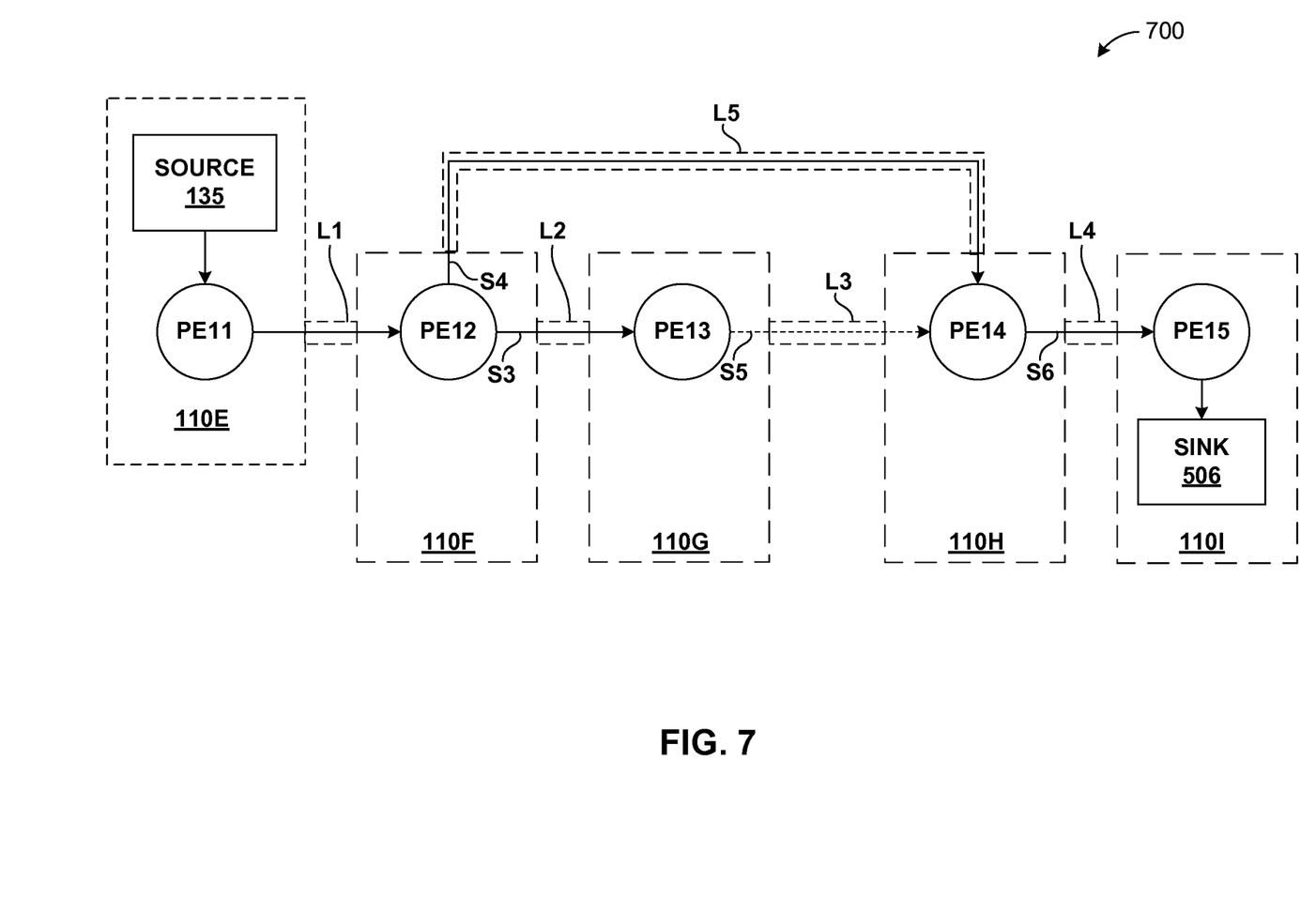
FIG. 7 illustrates a reconfiguration of the operator graph of FIG. 6 according to various embodiments.

According to various embodiments, processing elements may be reconfigured to conserve inter-process communication bandwidth. FIG. 7 illustrates a reconfiguration of the operator graph of FIG. 6 according to various embodiments. Referring to FIG. 7, a first processing element, e.g., PE12, that generates a first output stream S1 may be reconfigured when it is determined that a second processing element, e.g., PE13, receiving the first output stream S1 does not process all of the attributes of the tuples of the stream. The first processing element, e.g., PE12, may be reconfigured to output third and fourth output streams S3, S4 instead of the first output stream S1. Alternatively, PE12 may be reconfigured to output a modified output stream S1. The modified output stream S1 may have tuples that include only the attributes that are processed by the second processing element and not the attributes that are first processed by PE14. In this alternative, PE12 would still output the fourth output stream S4, as further described below.

The tuples of the third output stream S3 may include only the attributes that are processed by the second processing element. For example, the tuples of the third output stream S3 may include only the first attribute that is processed by the processing element PE13. The first processing element, e.g., PE12, may be reconfigured to output the third output stream S3 to the second processing element, e.g., PE13.

The tuples of the fourth output stream S4 may include attributes that are not processed by the second processing element, e.g., PE13, but which are processed by another processing element that receives tuples, directly or indirectly, from the second processing element, e.g., PE14. For example, the tuples of the fourth output stream S4 may include only the second attribute. It may be determined that the second attribute is first processed at processing element PE14. The processing element PE12 may be reconfigured to transmit the fourth output stream S4 directly to the processing element that first processes the second attribute, e.g., PE14. The processing element PE12 may be reconfigured to transmit the fourth output stream S4 directly to the processing element PE14 via an inter-process communication path L5. In one embodiment, the fourth output stream S4 may be "hidden" from a developer of a stream computing application. The reconfiguring of PE12 to transmit the third output stream S3 to PE13 and to transmit the fourth output stream S4 directly to PE14 may be performed by the stream manager 134 (FIG. 3)

at runtime. The stream manager 134 may change the physical flow of data, but it might not surface the changed data flow to the developer.

In one embodiment, the processing element PE13 may be reconfigured to transmit a fifth output stream S5 to the processing element PE14. The tuples of the fifth output stream S5 may include the first attribute. In addition, the third processing element PE14 may be reconfigured to join tuples of the fifth output stream S5 with corresponding tuples of the fourth output stream S4. In this way, the first and second attributes of the tuples of the first output stream S1 may be recombined into a single tuple, as is typically required. The processing element PE14 receives the first and second attributes in operator graph 700 just as PE14 receives the first and second attributes in operator graph 600. In operator graph 700, however, the first and second attributes arrive via separate paths and are recombined into a single tuple at PE14.

Reconfiguring the first processing element PE12 to generate two output streams S3, S4, each stream including only part of the attributes of the original output stream may reduce the load on parts of a network or other inter-process communication paths. For example, the tuples of the third output stream S3 transmitted on path L2 (and any additional intervening paths) in the above example will be smaller than the tuples of the first output stream S1 as they do not include the second attribute. Reducing use of inter-process communication paths may speed up the over flow of the operator graph.

In one embodiment, a compiler, e.g., the compiler 136, may determine the locations in an operator graph where each attribute of a tuple is processed at compile time. In addition, the compiler may determine, with respect to the first output stream S1 of a first processing element PE12 of operator graph 600, for example, whether the first attribute of S1 is to be first processed at a second processing element PE13 and whether the second attribute of S1 is to be first processed at a third processing element PE14. In addition, when it determines that these conditions are met, the compiler may reconfigure the first processing element to transmit a third output stream S3 to the second processing element PE13 and a fourth output stream S4 to the third processing element PE14. The tuples of the third output stream S3 may have only the first attribute and the tuples of the fourth output stream S4 may have only the second attribute.

While the compiler 136 may perform these determinations and reconfigurations automatically, it may be desirable to weigh the effect of the additional processing necessary to separate attributes of one tuple into distinct tuples and then join the attributes back into a single tuple at a downstream operator with inter-process communication path bandwidth savings. In one embodiment, the compiler 136 may perform these determinations or reconfigurations in response to a user input. A user may select to enable or disable a reconfiguration.

In one embodiment, a stream manager, e.g., the stream manager 134, may determine the locations in an operator graph where each attribute of a tuple is processed at runtime. The stream manager 134 may collect statistics for use in determining locations and optimizations while running a particular volume of live data or running in a production environment for a particular period of time. In addition, the stream manager may determine, with respect to the first output stream S1 of a first processing element PE12 of operator graph 600, for example, whether the first attribute of S1 is to be first processed at a second processing element PE13 and whether the second attribute of S1 is to be first processed at a third processing element PE14. In addition, when it determines that these conditions are met, the stream manager 134 may reconfigure the first processing element PE12 to transmit a third output stream S3 to the second processing element PE13 and a fourth output stream S4 to the third processing element PE14. The tuples of the third output stream S3 may have only the first attribute and the tuples of the fourth output stream S4 may have only the second attribute.

While the stream manager 134 may perform these determinations and reconfigurations automatically, it may be desirable to weigh the effect of the additional processing necessary to separate attributes of one tuple into distinct tuples and then join the attributes back into a single tuple at a downstream operator with inter-process communication path bandwidth savings. In one embodiment, the stream manager 134 may perform these determinations or reconfigurations in response to a user input. A user may select to enable or disable a reconfiguration.

In one embodiment, the stream manager 134 may determine whether the second attribute is first processed at the third processing element PE14 based on a historical percentage of time the second attribute is modified by the second processing element PE13. In some contexts, it may be acceptable to treat the second attribute as being first processed at PE14 when it is infrequently processed at PE13. For example, if it is determined from historical data that the second attribute is only processed at PE13 less than five percent of the time, the stream manager may determine that the second attribute is first processed at the third processing element PE14.

In one embodiment, the stream manager 134 may determine whether the second attribute is first processed at the third processing element PE14 based on a value of some other attribute. For example, assume the first output stream S2 includes first, second, and third attributes. The first and second attributes are successive images (first and second images) from a video and third attribute is a color difference metric between the first and second images. The color difference metric indicates that the color composition of the two images is substantially the same. In this example, PE13 analyzes an image to determine a color balancing factor and PE14 determines a motion vector between the two images. The stream manager 143 may determine that the second attribute is first processed at the third processing element PE14 where it is needed for motion vector determination based on a value of the third attribute. The stream manager 143 may infer from the third attribute (the color difference metric) that the color balancing factor PE13 determined for the first attribute may be used for the second attribute. Accordingly, it may not be necessary for PE13 to process the second attribute. Thus, the stream manager 143 may determine that the second attribute is first processed at PE14.

As mentioned, the stream manager 134 may collect statistics in a production environment and analyze the statistics to determine an optimization. The analysis may identify a pattern. As a first example, the collected statistics may analyze N+1 tuples having first and second attributes. Analysis of the collected statistics may indicate that a processing element does not process the first attribute of the N+1th tuple when the second attribute in the previous N tuples has not changed, i.e., a frequency. As a second example, the collected statistics may analyze two or more tuples having a first attribute and a timestamp attribute. Analysis of the collected statistics may reveal a pattern that a processing element does not process the first attribute when the timestamp attribute indicates a particular time or time period, e.g., 10 PM-8 AM. As a third example, analysis of the collected statistics indicates a pattern related to a count value, such as a processing element does not process the first attribute of every $10^{th}$ tuple in a sequence of tuples. As a fourth example, analysis of the collected statistics of tuples having first, second, and third attributes indicates a pattern that when the first and second attributes are substantially the same, a processing element does not process one of the attributes. Accordingly, the stream manager may determine whether the second condition is met based on a frequency, time, count, or delta of an attribute of a tuple.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A system for processing a stream of tuples, comprising:
   one or more computer processors;
   one or more memories to store two or more processing elements, the processing elements to receive two or more tuples to be processed, the processing elements operating on the one or more computer processors, the two or more processing elements including:
   a first processing element initially configured to transmit a first output stream to a second processing element, the tuples of the first output stream having first and second attributes,
   the second processing element initially configured to transmit a second output stream to a third processing element, the tuples of the second output stream having the first and second attributes;
   a unit to:
   determine whether first and second conditions are met, the first condition being that the first attribute is to be first processed at the second processing element, the second condition being that the second attribute is to be first processed at the third processing element; and
   reconfigure the first processing element, when the first and second conditions are met, to transmit:
   a third output stream to the second processing element, the tuples of the third output stream having only the first attribute, and
   a fourth output stream to the third processing element, the tuples of the fourth output stream having only the second attribute.

2. The system of claim 1, wherein the third processing element is initially configured to receive the second output stream via one or more intervening processing elements.

3. The system of claim 1, wherein the unit is a compiler.

4. The system of claim 1, wherein the unit is a stream manager.

5. The system of claim 4, wherein the stream manager determines whether the second condition is met based on a historical percentage of time the second attribute is modified by the second processing element.

6. The system of claim 4, wherein the two or more tuples to be processed include a third attribute and the stream manager determines whether the second condition is met based on a value of the third attribute of one of the two or more tuples.

* * * * *